(12) United States Patent
Mishra et al.

(10) Patent No.: US 12,393,868 B2
(45) Date of Patent: Aug. 19, 2025

(54) COMBINING DATA DRIVEN MODELS FOR CLASSIFYING DATA

(71) Applicant: BASF SE, Ludwigshafen am Rhein (DE)

(72) Inventors: Arunav Mishra, Mannheim (DE); Juergen Mueller, Ludwigshafen (DE); Lalita Shaki Uribe Ordonez, Mannheim (DE)

(73) Assignee: BASF SE, Ludwigshafen am Rhein (DE)

( * ) Notice: Subject to any disclaimer, the term of this patent is extended or adjusted under 35 U.S.C. 154(b) by 865 days.

(21) Appl. No.: 17/477,971

(22) Filed: Sep. 17, 2021

(65) Prior Publication Data

US 2022/0092478 A1 Mar. 24, 2022

(30) Foreign Application Priority Data

Sep. 18, 2020 (EP) .................................. 20197057

(51) Int. Cl.
*G06N 5/04* (2023.01)
*G06N 3/08* (2023.01)
*G06N 20/00* (2019.01)

(52) U.S. Cl.
CPC ............... *G06N 20/00* (2019.01); *G06N 3/08* (2013.01); *G06N 5/04* (2013.01)

(58) Field of Classification Search
None
See application file for complete search history.

(56) References Cited

U.S. PATENT DOCUMENTS

| | | | |
|---|---|---|---|
| 9,928,448 B1 | 3/2018 | Merler et al. | |
| 10,671,952 B1* | 6/2020 | Chang | G06Q 10/067 |
| 2010/0082400 A1 | 4/2010 | Bagherjeiran et al. | |
| 2015/0199609 A1* | 7/2015 | Rao | G06N 20/00 |
| | | | 706/12 |
| 2015/0254555 A1 | 9/2015 | Williams, Jr. et al. | |
| 2016/0224662 A1* | 8/2016 | King | G06N 20/00 |
| 2017/0060993 A1* | 3/2017 | Pendar | G06F 16/334 |
| 2018/0232528 A1 | 8/2018 | Williamson et al. | |
| 2019/0294881 A1 | 9/2019 | Polak et al. | |
| 2020/0285939 A1* | 9/2020 | Baker | G06N 3/045 |

OTHER PUBLICATIONS

A. Ratner et al.: "Snorkel: Rapid Training Data Creation with Weak Supervision" (2017), 17 pages.
A. Ratner et al.: "Data Programming: Creating Large Training Sets, Quickly" (2016), 26 pages.
M. E. Peters et al.: "Deep contextualized word representations" (2018), 15 pages.

* cited by examiner

*Primary Examiner* — Xuyang Xia
(74) *Attorney, Agent, or Firm* — Lowenstein Sandler LLP

(57) ABSTRACT

The present invention relates to classifying data (24). A first data driven model (50) is trained based on labeled historic data (44). A second data driven model (60), comprises a set of rules (42). Data (24) to be classified is obtained at the first data driven model (50) and the second data driven model (60). A first classification (52) is determined for the data (24) by the first data driven model (50) and a second classification (62) is determined for the data (24) by the second data driven model (60). A result signal (80) is provided based on the classifications (52, 62).

12 Claims, 8 Drawing Sheets

COMBINING DATA DRIVEN MODELS FOR CLASSIFYING DATA

FIELD OF THE INVENTION

The present invention relates to a system for classifying data, a computer implemented method for classifying data, and a computer program product for classifying data.

BACKGROUND OF THE INVENTION

Recent breakthroughs in supervised binary text classification are achieved by application of deep neural networks (DNN), making it highly applicable for industrial problems. Capabilities such as automatic feature learning, generalizability via pretraining, and weight sharing are strengths of such neural network models. For practical use-cases in industrial applications classifiers must also indicate when a classification decision provided by them is likely to be incorrect. This is usually identified by looking into confidence scores of the classification decision, i.e., probabilities associated with the predicted label, for a given document. In case of binary classification, for example, confidence scores indicate a probability that a label is positive.

As disclosed in "On Calibration of Modern Neural Networks" by C. Guo et al., published in Proceedings of the 34th International Conference on Machine Learning, Sydney, Australia, PMLR 70, 2017, modern machine learning (ML) models have become more accurate, but usually tend to be overconfident, i.e., generating high confidence scores even when they make mistakes. This reduces reliability on the data classification performed by the modern ML models. Blindly relying on such confidence scores may diminish performance of the application in which such data is used. Guo et al. state that a calibrated confidence measure should be provided in addition to the prediction of the ML model, e.g., a probability associated with a predicted class label should be provided which reflects its ground truth correctness likelihood. Guo et al. show that temperature scaling, a single-parameter variant of Platt scaling, may be effective at calibrating predictions in a post-processing calibration method.

The publication "Snorkel: Rapid Training Data Creation with Weak Supervision" by A. Ratner et al., published as arXiv:1711.10160v1 (https://arxiv.orgiabs/1711.10160) discloses a system for labeling training data by labeling functions that express arbitrary heuristics written by users. The system learns a generative model over the labeling functions, which allows it to estimate their accuracies and correlations. The output of the generative model is a set of probabilistic labels that can be used to train a discriminative model which generalizes beyond the information expressed in the labeling functions.

SUMMARY OF THE INVENTION

It can be seen as an object of the present invention to provide a system for classifying data, a computer implemented method for classifying data, a computer program product for classifying data, and a computer readable medium which allow an improved classification of data.

In a first aspect of the present invention a system for classifying data comprising a communication interface and a processor is presented. The system is configured for providing a first data driven model, a second data driven model, obtaining data at the first data driven model and at the second data driven model via the communication interface, determining a first classification for the data by the first data driven model, determining a second classification for the data by the second data driven model, and providing a result signal based on the classifications. The first data driven model is trained based on labeled historic data and the second data driven model comprises a set of rules.

Since the system provides a result signal based on the classifications of the same data by a rules-based model and a model trained based on labeled historic data, i.e., labeled training data, improved classifications may be obtained. A system is provided that allows to introduce rules, e.g., domain heuristics into classification models. This allows increasing reliability of the classification. Furthermore, the classifications may become deducible interpretable. Rules-based models have a drawback that they should ensure completeness of rules. Prior art models trained based on labeled training data, in particular deep neural networks (DNNs), cannot easily, explicitly incorporate heuristics as they automate feature engineering. Further, nonlinearity and abstractions through layers, e.g., in first data driven models such as DNNs, make such models "deducible uninterpretable". Since the system provides the result signal based on both classifications of the same data shortcomings of each of the models may be compensated by the other model. The system allows improved classifying of data which is prone to misclassification even when it receives high confidence scores during inference without gold standard labels. The overconfident misclassifications performed by the first data driven model, e.g., DNN, may be controlled by applying the second data driven model. Even if a perfect rules-based model may not be trained as this would require a perfect set of rules, the combination of both models may significantly reduce the risk of misclassification. Furthermore, the system allows estimating uncertainty to better identify misclassification. Additionally, the system allows performing classification of the same data in parallel by the first data driven model and the second data driven model, which may reduce time for the classification compared to performing sequential classification by refining classification of data output by the first data driven model in the second data driven model in a subsequent classification step. Performing classification of the same data in parallel by the first data driven model and the second data driven model furthermore allows to increase robustness of the system as the first data driven model and the second data driven model may perform classifications independently from each other without any bias from previous classification performed by the other data driven model. For example, the first data driven model and the second data driven model may be trained independently from each other.

The processor may be configured for providing the first data driven model, providing the second data driven model, determining the first classification for the data by the first data driven model, determining the second classification for the data by the second data driven model, and/or for providing the result signal based on the classifications.

The data may, for example, be an image, a document, a text file, an audio file, a video file, or any other type of data.

The set of rules may comprise a number of rules, for example, three or more rules. The rules may be provided by an expert user, e.g., via the communication interface. The rules of the set of rules may be derived from domain knowledge.

The rules may include domain heuristics, ontologies, patterns, or any other rules. The second classification may be provided in form of a heuristic classifier. All rules of the set of rules may be applied to the data for determining the second classification. The second classification may, for example, be determined based on a majority vote of the rules or a weighted vote of the rules in case that rules have different importance, e.g., indicated by different importance scores for the rules. Each rule may classify the data into a class, e.g., positive or negative if the classification is based on a binary classification between positive and negative. For a majority vote, for example, all rules have an identical weight and the data is labeled as positive in case that more rules classify the data as positive and the data is labeled as negative in case that more rules classify the data as negative. A confidence score, i.e., probability score, may be provided based on the majority vote as ratio of positive classifications to negative classifications based on the number of rules which classify the data as positive and the number of rules which classify the data as negative. The second data driven model may output, for example, a score for the data, e.g., a ratio of positive classifications to negative classifications. Alternatively, or additionally, the second data driven model may output, for example, a label for the data, e.g., positive or negative.

The rules may be included, for example, in labeling functions. The labeling functions may indicate patterns, ontologies, heuristics, external knowledge bases, or the like. The labeling functions take data as input and output a second classification, e.g., a score and/or a label.

The second classification may also include that the data cannot be classified by the labeling functions. A labeling function may be, for example, a combination of rules in which a score is provided for each rule in dependence of the rule being fulfilled or not. The labeling function may include weights for each of the rules. For example, in case of a binary classification between positive and negative, the second data driven model may assign the label to the data based on a threshold score, for example, 0.5. In this case the second data driven model may assign the label to the data as positive if the weighted average of the scores of the labeling functions is above 50%, i.e., above 0.5, and as negative if the weighted average of the scores of the labeling functions is below 50%, i.e., below 0.5.

The rules may be provided in Boolean query language. Each rule may be provided as a Boolean query. The rules may include, for example, AND, OR, NOT, XOR, or any other Boolean operators. The rules may indicate heuristics for which the data is classified as negative or positive, i.e., the rules may be binary, e.g., positive rules and negative rules. A rule may indicate a good pattern that may be present in relevant or ballast data.

The second data driven model may comprise an ensemble model, in particular a generative model, learned based on the set of rules and the labeled historic data. The rules may be weak learners or weak classifiers, respectively. In other words, the second data driven model may be or include a weak classifier model including an ensemble of weak classifiers. This may allow to transform the weak classifiers into a strong one improving the classification of the second data driven model as biases from overlapping rules may be removed. The generative model is a statistical model of the joint probability distribution of the rules and the labeled historic data wherein the generative model is learned based on fitting it to the labeled historic data. Any type of ensemble model, in particular any type of generative model, may be used. The generative model allows to determine how good the rules fit the labeled historic data. For example, it may be determined for which percentage of the labeled historic data, correct labels are assigned by the rule. This may correspond to an importance of a rule. A corresponding importance score for a respective rule may be calculated, for example, by determining a ratio of correctly assigned labels to a total number of data points. The importance score for a rule may be determined, for example, based on a weight assigned to the rule during training of the generative model. The generative model may perform a weighted majority voting wherein the weights of the rules correspond to their importance. Additionally, or alternatively, the generative model may provide a score to the data, e.g., probability score for the data to be positive.

The generative model may be provided, for example, based on the generative model disclosed in section "3 The data programming paradigm" and corresponding appendix as disclosed in "Data Programming: Creating Large Training Sets, Quickly" by A. Ratner et al., published in arXiv: 1605.07723v3 (https://arxiv.org/abs/1605.07723) and/or section "2. Snorkel Architecture" and in particular section "2.2 Generative Model" as disclosed in "Snorkel: Rapid Training Data Creation with Weak Supervision" by A. Ratner et al., published as arXiv:1711.10160v1 (https://arxiv.org/abs/1711.10160), which are incorporated herein by reference. In contrast to arXiv:1605.07723v3 and arXiv:1711.10160v1, the present generative model is trained on labeled historic data and not unlabeled training data.

The generative model may also be learned, for example, over the labeling functions. The generative model may be configured for estimating accuracies of the labeling functions. This may allow to determine a probability score for a respective label assigned by the labeling functions to the data as second classification. The probability score may correspond, for example, to a probability for the label to be positive in case of a binary classification. Each labeling function may be modeled as a noisy voter which is dependent or independent, i.e., errors of the voter are uncorrelated to the other voters.

The second data driven model may be configured for determining the second classification based on the probability score for the respective label, e.g., if the label is a binary label, such as positive or negative, the label for the second classification may be selected in dependence of a threshold score as positive if the probability score is above the threshold score and negative if the probability score is below the threshold score. The second data driven model may also be configured for determining the probability score for the respective label based on a majority vote of the different labeling functions. The second data driven model may be configured for determining the probability score for the respective label based on majority vote of the labeling functions if, for example, the number of labeling functions is low, such as below 10, or high, such as above 100, and for determining the probability score for the respective label based on the generative model if the number of labeling functions is in between the low and high number of labeling functions. This may equivalently apply in case of rules instead of labeling functions.

Additionally, the generative model may be configured for estimating correlations or dependencies of the respective labeling functions. The dependencies may include different types, such as similar, fixing, reinforcing, and exclusive, as disclosed in section "4 Handling dependencies" and the corresponding appendix as disclosed in "Data Programming: Creating Large Training Sets, Quickly" by A. Ratner et al., published in arXiv:1605.07723v3 (https://arxiv.org/abs/1605.07723), which is incorporated herein by reference.

The generative model may be a factor graph, e.g., factor graph using a factor function as for example disclosed in section "4 Handling dependencies" and the corresponding appendix as disclosed in "Data Programming: Creating Large Training Sets, Quickly" by A. Ratner et al., published in arXiv:1605.07723v3 (https://arxiv.orgiabs/1605.07723), which is incorporated herein by reference.

The ensemble model, in particular the generative model, may be configured for assigning an importance score to each of the rules based on its fit on the labeled historic data. A better fit of a respective rule to the labeled historic data may result, for example, in a higher importance score for the rule. Additionally, the system may be configured for optimizing the labeled historic data based on the importance scores assigned to the rules. Based on the importance of the rules, a quality of the labeled historic data may be evaluated. A lower importance score assigned to a rule than an expert user would assign to the rule may, for example, indicate that the labeled historic data is not well constructed and thus has low quality. In order to improve the quality of the labeled historic data, for example, more representative data may be added to the labeled historic data such that it better reflects the importance of the respective rule.

The generative model may use weights along with precision and recall. The importance scores may correspond to the weights. This may allow reducing a negative effect caused by discounting that may happen in the factor graph. For example, the second data driven model may include several excellent rules based on precision and recall, but if they have high overlap then finally in the generative model they would be discounted.

The labeled historic data may be optimized such that the rule that is important receives a higher importance score when the generative model is retrained based on the optimized labeled historic data. This furthermore allows improving the training of the first data driven model based on the optimized labeled historic data. This may allow to improve the classification based on improved first and second data driven models.

The system may be configured for receiving external importance scores via the communication interface. The external importance scores may be provided by an external server or by a user, e.g. the expert user. The external importance scores may indicate an importance of the rule based on domain knowledge, e.g., obtained by studying the domain. The system may be further configured for comparing the importance scores with the external importance scores, e.g., by calculating a difference between the importance scores and the external importance scores. Additionally, the system may be configured for requesting additional labeled historic data which fits a respective rule for which the external importance score is larger than the importance score by a certain threshold importance score. This allows optimizing the labeled historic data and thus the classification of the data. The system may, for example, be configured for requesting the additional labeled historic data which fits the respective rule from an external server. Alternatively, the system may be configured for preprocessing the labeled historic data, e.g., augmenting the labeled historic data, e.g., by removing outliers, by removing data which does not fit the expected classification distribution or by any other augmenting step, such that it better fits the respective rule. This allows to optimize the labeled historic data in case that an important rule has a bad importance score based on its fit on the labeled historic data.

The first data driven model may include a neural network, e.g., a DNN. The first data driven model may also be a neural network. This allows incorporating domain heuristics into a framework to be used with deep learning models, e.g., DNNs.

The first classification may be provided in form of a neural network based classifier, e.g., text classifier, binary text classifier, image classifier, speech classifier, or any other type of classifier. The first data driven model may include or be, for example, a convolutional neural network (CNN). The labeled historic data may include discrete labels, e.g., binary labels.

The neural network may be pretrained. Pretrained weights of the neural network may be obtained, for example, based on a previous training of the neural network, e.g., stored in the system or provided by an external server.

In one embodiment, GloVe embeddings according to the GloVe model as disclosed in "GloVe: Global Vectors for Word Representation" by J. Pennington et al. published in Proceedings of the 2014 Conference on Empirical Methods in Natural Language Processing (EMNLP), pages 1532-1543, Oct. 25-29, 2014, Doha, Qatar and on https://nlp.stanford.edu/projects/glove/ are used for preprocessing the labeled historic data. This is followed by parametric attention. The preprocessed data may then be used for training a CNN. This may allow providing a CNN which can be trained fast.

In another embodiment, skip-gram embeddings may be used for preprocessing the labeled historic data followed by ELMo pretraining as disclosed in "Deep contextualized word representations" by M. E. Peters et al. published in arXiv:1802.05365v2 (https://arxiv.org/abs/1802.05365). The preprocessed data may then be used for training a CNN. This may allow providing an improved CNN which takes more training time than the one preprocessed by GloVe embeddings and parametric attention.

The first data driven model may be configured for automatically extracting features from the labeled historic data and for learning a classification model based on the labeled historic data for providing the first classification. The first classification may be provided in form of a label. The classification model may be configured for estimating a probability score for the label assigned to the data.

The first data driven model may be independent of the set of rules. This renders the first data driven model and second data driven model independent from each other. This may allow to combine various CNNs with the second data driven model without diminishing the benefits of combining the first data driven model with the second data driven model for improving data classification.

The system may be configured for determining the result signal based on comparing the first classification with the second classification. The system may be configured for comparing the first classification with the second classification by calculating a difference between a score of the first classification and a score of the second classification. The score of the first classification may be the probability score for the label assigned to the data by the first data driven model and the score of the second classification may be the score assigned to the data by the second data driven model, e.g., the score determined by the generative model. The system may be configured for providing the result signal as classifying the data as risky if the difference between the score of the first classification and the score of the second classification is above a certain threshold difference score. Alternatively, the system may be configured for providing the result signal as classifying the data according to the first classification or according to the second classification based on the scores of the first classification and the second classification. The threshold difference score may be an adjustable parameter allowing to balance between risk and cost saving. The threshold difference score may be adjusted, e.g., via the communication interface or via a user interface included in the system. The user interface may, for example, be included in the communication interface. This allows to provide an explicit handle to balance between risk tolerance and cost saving.

The system may be configured for determining the result signal, for example, as a label to the data corresponding to an identical label assigned by the first classification and the second classification if the first classification and the second classification assign the identical label to the data, e.g., positive or negative.

The system may be configured for calculating the difference between the score of the first classification and the score of the second classification, for example, if the labels assigned by the first classification and the second classification are not identical. The system may be configured for providing the result signal as risky if the difference between the score of the first classification and the score of the second classification is above a certain threshold difference score. The system may be configured for determining the result signal as a label to the data corresponding, for example, to an average score of the scores of the first classification and the second classification.

The first classification may be determined, for example, based on a binary classification between positive and negative. The system may be configured for calculating the difference between the score of the first classification and the score of the second classification only for data which has been classified as negative by the first classification. This allows increasing reliability on the classification as false negatives can be minimized while keeping false positives low. If the data includes, e.g., documents, false positives may imply that users have to read more documents, while false negatives may imply missing documents that may turn out to be critical. If the first data driven model classifies the data to be positive, the system may be configured to provide the result signal based on the first classification, e.g., labeling the data according to the first classification, namely positive. The system may also be configured for determining the second classification for the data by the second data driven model only if the first classification for the data is determined to be negative. This allows to reduce calculation load while allowing to improve reliability of the classification.

The communication interface may be configured for receiving the data, the labeled historic data, the set of rules, or any combination thereof. Additionally, the communication interface may be configured for transmitting the result signal, displaying the result signal, or transmitting and displaying the result signal. This allows the system to function as a web service, where users can upload labeled historic data and their set of rules for training the system. Furthermore, the web service allows the users to upload data to be classified by the system. The result signal may indicate the classification of the data. The communication interface may include a display for displaying the result signal. Alternatively, the result signal may be transmitted to a user device by the communication interface. The result signal may be displayed to the user via the user device in this case.

In a further aspect of the invention, a computer implemented method for classifying data is presented. The method comprises the steps:
providing a first data driven model, wherein the first data driven model is trained based on labeled historic data,
providing a second data driven model, wherein the second data driven model comprises a set of rules,
obtaining data,
determining a first classification for the data by the first data driven model,
determining a second classification for the data by the second data driven model, and
providing a result signal based on the classifications.

This allows providing an improved method for classifying data.

The computer implemented method may comprise one or more of the steps:
providing the rules in Boolean query language,
training a generative model included in the second data driven model based on the set of rules and the labeled historic data,
assigning by the generative model an importance score to each of the rules based on its fit on the labeled historic data,
optimizing the labeled historic data based on the importance scores assigned to the rules,
providing the first data driven model including a neural network,
providing the first data driven model such that it automatically extracts features from the labeled historic data and learns a classification model based on the labeled historic data for providing the first classification,
providing the first data driven model such that it is independent of the set of rules,
determining the result signal based on comparing the first classification with the second classification by calculating a difference between a score of the first classification and a score of the second classification,
providing the result signal as classifying the data as risky if the difference between the score of the first classification and the score of the second classification is above a certain threshold difference score,
adjusting the threshold difference score in order to balance between risk and cost saving,
determining the first classification based on a binary classification between positive and negative,
determining the second classification based on a binary classification between positive and negative,
calculating the difference between the score of the first classification and the score of the second classification only for data which has been classified as negative by the first classification,
obtaining the labeled historic data,
obtaining the set of rules,
transmitting the result signal, and
displaying the result signal.

In a further aspect a computer program product for classifying data is presented. The computer program product comprises program code means for causing a processor to carry out the method according to claim 11, or any embodiment of the method, when the computer program product is run on the processor.

In another aspect a computer-readable medium having stored the computer program product according to claim 12 or any embodiment of the computer program product is presented.

It shall be understood that the system for classifying data of claim 1, the computer implemented method of claim 11 the computer program product of claim 12, and the computer-readable medium have similar and/or identical preferred embodiments, in particular, as defined in the dependent claims.

It shall be understood that a preferred embodiment of the present invention can also be any combination of the dependent claims or above embodiments with the respective independent claim.

These and other aspects of the invention will be apparent from and elucidated with reference to the embodiments described hereinafter.

DETAILED DESCRIPTION OF EMBODIMENTS

Figure 1:
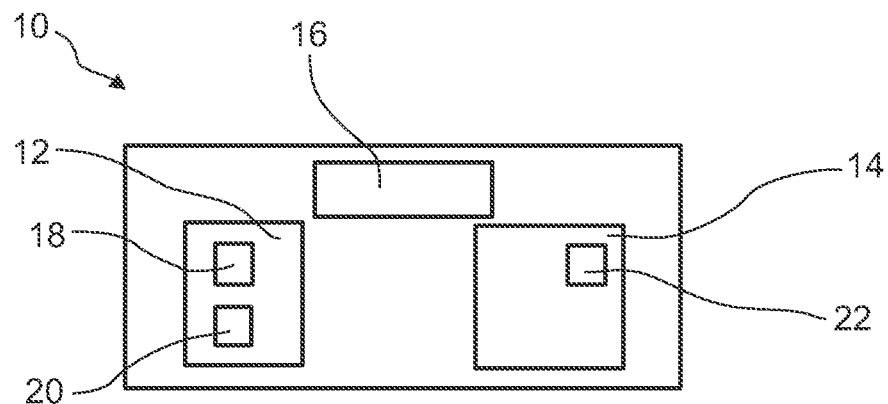
FIG. 1 shows schematically and exemplarily an embodiment of the system for classifying data.

FIG. 1 shows system 10 for classifying data. The system 10 comprises a control unit 12, a communication interface 14, and an antenna array 16. In other embodiments, the antenna array may also be a single antenna for providing a wireless connection. Instead of an antenna array, a port may be provided for connecting a cable in order to provide a wired connection.

The control unit 12 includes a processor 18 and a computer readable medium in form of memory 20. The processor 18 processes data, e.g., performing calculations, while memory 20 stores data.

In this embodiment, the memory 20 stores a computer program product for classifying data. The computer program product includes program code means for causing processor 18 to carry out a method for classifying data when the computer program product is run on the processor 18, e.g., method 800 presented in FIG. 8. Furthermore, the memory 20 stores a set of rules, labeled historic data, and data, e.g., received via the communication interface 14.

The communication interface 14 includes a transceiver 22. In other embodiments, the communication interface may additionally include a user interface, e.g., a touch screen display for allowing a user to directly interact with the system. In this embodiment, the system 10 may exchange data via the communication interface 14 and the antenna array 16.

Figure 2:
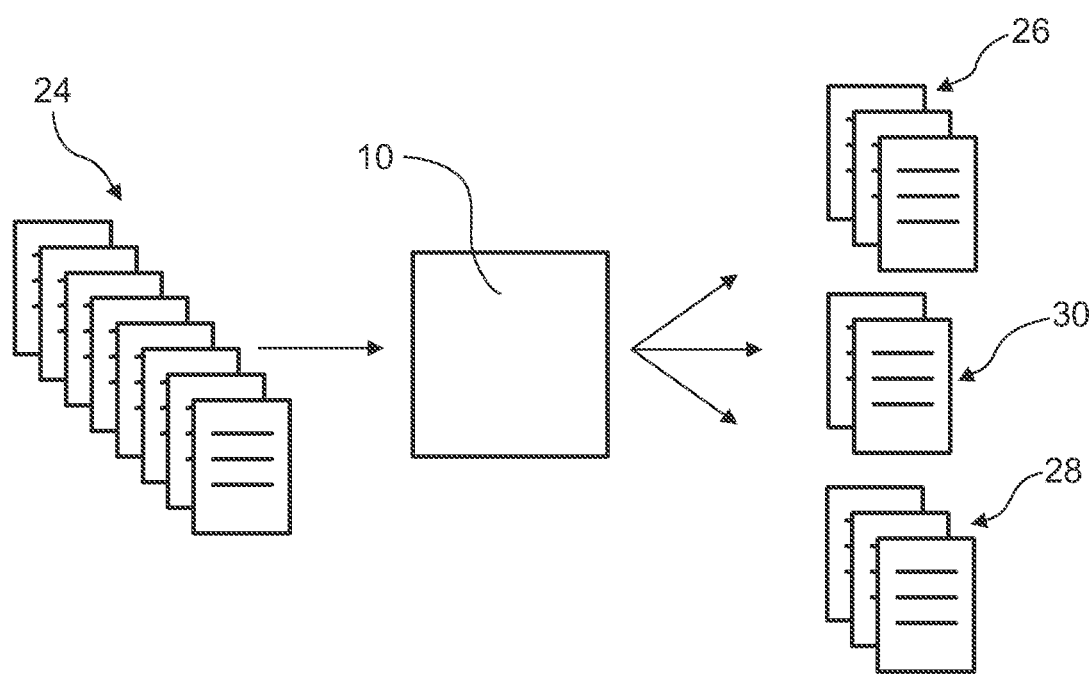
FIG. 2 shows schematically and exemplarily a classification of data into three different categories by the system.

FIG. 2 shows classifying data 24 in form of documents by the system 10 into three different categories, namely positive 26, negative 28, and risky 30. The embodiment of the system 10 is described in context of binary text classification, i.e., the document is either classified as positive or negative. Only in cases in which the system 10 is not confident in classifying the document as either positive or negative, the document is classified as risky, i.e., neither positive nor negative label can be assigned with sufficient confidence. System 10 makes use of an ML model and a rules-based model. System 10 is not restricted to text classification and may be applied to various classification problems, such as classifying images, speech, or any other classification problem.

Figure 3:
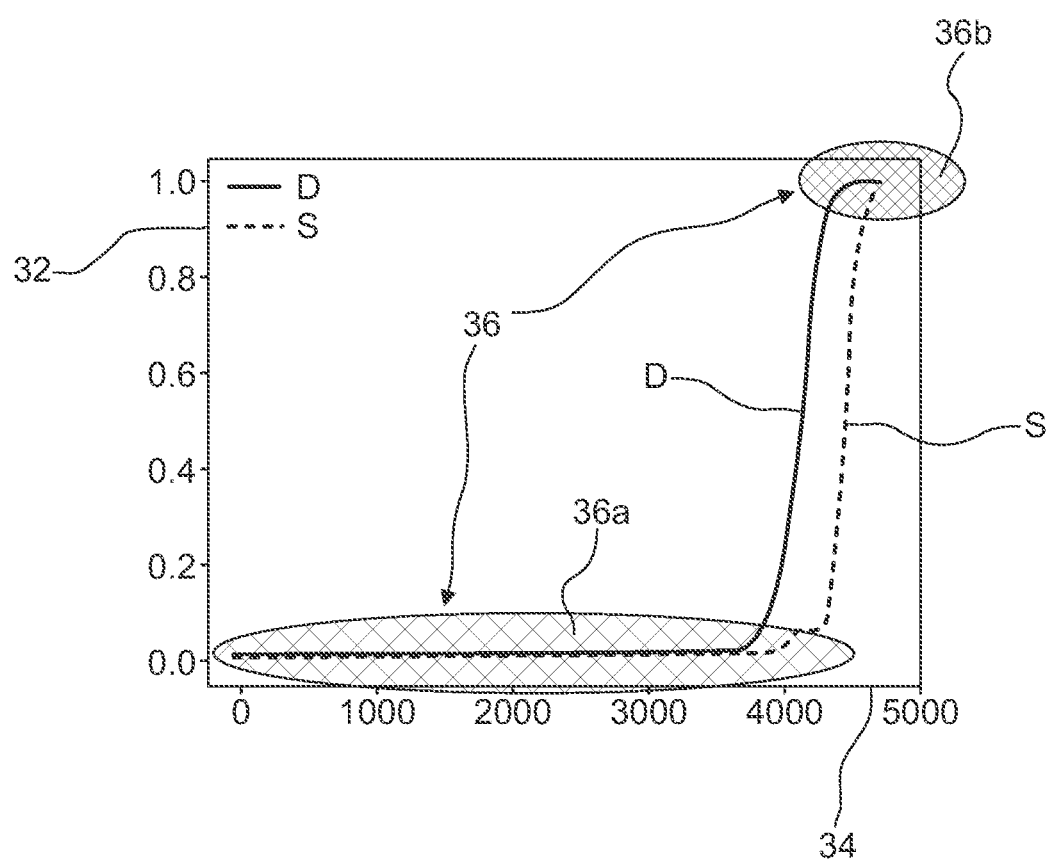
FIG. 3 shows a graph of confidence scores for various documents.

FIG. 3 shows a graph of confidence scores for various documents determined by two different ML models, i.e., D (Deep) and S (Standard). The vertical axis 32 shows the confidence scores of various documents with respective document number arranged on the horizontal axis 34. The confidence scores correspond to a probability of the label of the document to be positive, i.e., a document with confidence score 1 is labeled positive with absolute confidence while a document with confidence score 0 is labeled negative with absolute confidence. Both ML models, have high confidence in their predictions of the labels in regions 36. The lower region 36a indicates a negative classification, i.e., score around 0, while the upper region 36b indicates a positive classification, i.e., score around 1. Prior art ML models tend to be overconfident, even when they make mistakes. In order to mitigate the risk of erroneous classifications, system 10 is used.

Figure 4:
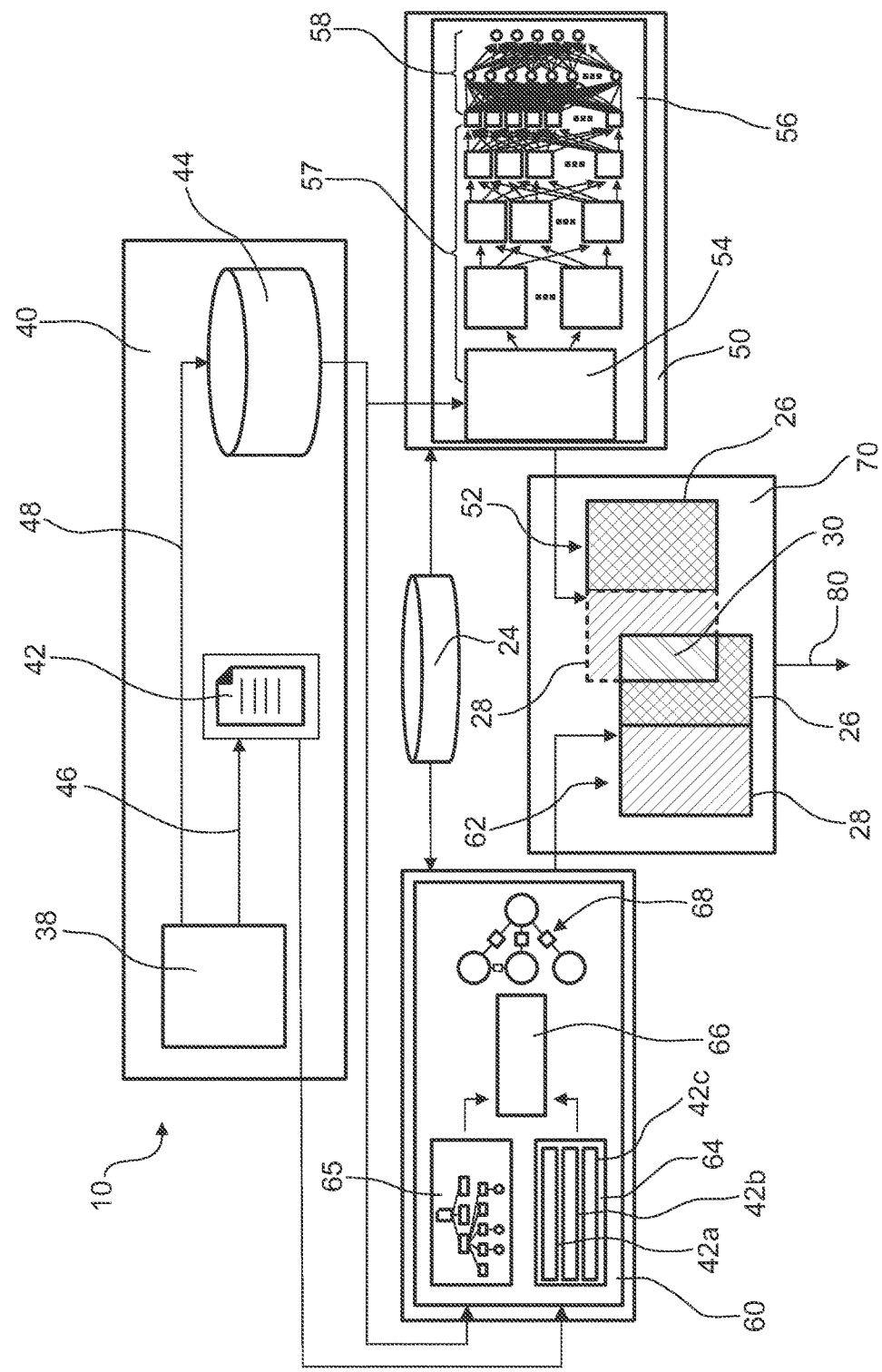
FIG. 4 shows schematically and exemplarily details of the classification process performed by the system for classifying data shown in FIG. 1.

In the following, functionality of system 10 is explained with respect to FIG. 4. FIG. 4 shows schematically and exemplarily details of the classification process performed by the system 10 for classifying data 24. The system 10 is designed as a risk mitigating framework. In this embodiment, the control unit 12, the communication interface 14, and antenna array 16 are not shown in order to improve the overview of the schematic figure. Instead it is shown how the system 10 classifies data using the control unit 12, the communication interface 14 and the antenna array 16.

In a nutshell, system 10 includes a bootstrapping module 40, a first data driven model 50, a second data driven model 60, and a comparison module 70. The first data driven model 50 is trained based on the labeled historic data 44. The second data driven model 60 comprises the set of rules 42, in particular, rules 42a, 42b, and 42c. Data 24 is obtained via the communication interface 14 and antenna array 16 and provided to the first data driven model 50 and the second data driven model 60. The first data driven model 50 determines a first classification 52 for the data 24 and the second data driven model 60 determines a second classification 62 for the data 24. The first classification 52 and the second classification 62 are compared in the comparison module 70 which provides a result signal 80 based on a result of the comparison of the classifications. The result signal 80 is transmitted via the communication interface 14 and the antenna array 16 to an expert user 38. In other embodiments, the result signal may also be displayed.

In the following, the functionality of modules 40 and 70, as well as models 50 and 60 is explained in more detail.

Initially, in the bootstrapping module 40, a set of rules 42 and labeled historic data 44 are provided by the expert user 38 via the communication interface 14 and antenna array 16 (not shown). The set of rules 42 is provided by Boolean query language 46, i.e., the expert user 38 formulates Boolean queries for the rules, e.g., by concatenating conditions with Boolean operators, including AND, OR, NOT, XOR, or any other Boolean operator. Additionally, the expert user 38 labels training data and this labeled training data 48 is provided as labeled historic data 44.

The labeled historic data 44 is provided to the first data driven model 50. Additionally, the labeled historic data 44 and the set of rules 42 are provided to the second data driven model 60. The labeled historic data 44 is used to train the first data driven model 50. The second data driven model 60 comprises a generative model 68 learned based on the set of rules 42 and the labeled historic data 44.

The first data driven model 50 includes a neural network in form of pretrained CNN 56 which receives weights from preprocessing module 54 in which the labeled historic data 44 is used for training the CNN 56. Therefore, the first data driven model 50 automatically extracts features from the labeled historic data 44 and learns CNN 56 as a classification model based on the labeled historic data 44 for providing a first classification 52 for the data 24. The CNN 56 is independent of the set of rules 42. In this embodiment, CNN 56 includes convolution layers 57 and fully connected layers 58. The CNN 56 receives the data 24 and classifies the data 24 by determining the first classification 52 for the data 24 as either positive 26 or negative 28. In this embodiment, the CNN 56 provides a score for the first classification 52 indicating a probability for the label to be positive 26. In other embodiments, any other type of classification model, e.g., any other type of neural network may be included in the first data driven model for classifying data.

The second data driven model 60 includes a rule module 64, a context hierarchy module 65, an optimizer 66, and a generative model 68. The set of rules 42 is provided to the rule module 64 and the labeled historic data 44 is provided to the context hierarchy module 65.

In the rule module 64, the set of rules 42 provided by the expert user 38 is provided as rules 42*a*, 42*b*, and 42*c*. Each of the rules 42*a*, 42*b*, and 42*c* outputs either a positive label or a negative label to data input to the respective rule if the rule is fulfilled by the data.

In the context hierarchy module 65, the labeled historic data 44 is processed in order to form a context hierarchy which is made up of context types connected by parent/child relationships. These are stored in a relational database included in the memory 20 (not shown). In this embodiment, the context hierarchy includes different layers starting with a document which contains one or more sentences. Each sentence contains one or more spans of text. The spans may be tagged with metadata, such as entity markers identifying them as a cause and effect. The spans are used by the rules 42*a*, 42*b*, and 42*c* for labeling the document. In other embodiments other context hierarchies may be used.

The rules 42*a*, 42*b*, and 42*c* and the output of the context hierarchy module 65 are provided to optimizer 66 in order to train a generative model 68. In this embodiment, the generative model 68 is a factor graph which includes weights in form of importance scores for each of the rules 42*a*, 42*b*, and 42*c*. The importance scores are determined based on a ratio of correctly assigned labels to the data by the respective rule to a total number of data points. The optimizer 66 adjusts the importance scores such that the generative model 68 assigns a minimal number of incorrect labels to the labeled historic data 44. After optimization by optimizer 66 is finished, i.e., after the generative model 68 is trained, the generative model 68 can be used for classifying the data 24. The generative model 68 receives the data 24 and classifies the data 24 by determining a second classification 62 for the data 24 as either positive 26 or negative 28. In this embodiment, the second classification 62 includes a score which represents a probability for the label to be positive 26 and classifies the data to be positive 26 or negative 28 based on a threshold score. In other embodiments, the second data driven model may determine the score and assign the label to the data based on a majority vote of the rules. The system may also be configured for determining the second classification as a score for the data, i.e., without assigning a label to the data. In yet other embodiments, the system may be configured for determining the second classification including the score and assign the label by the generative model or the majority vote to the data in dependence of a number of rules or labeling functions.

The first classification 52 and the second classification 62 are provided to the comparison module 70. If both models 50 and 60 provide an identical label for the data, the label is assigned to the data 24 and a corresponding result signal 80 indicating this label is transmitted. In other embodiments, further conditions may be considered, e.g., that an average score of the classifications is above and/or below a certain threshold average score. Furthermore, in this embodiment, if the first data driven model 50 provides a positive label for the data, the label is assigned to the data 24 and a corresponding result signal 80 indicating this label is transmitted.

In this embodiment, a difference between the score of the first classification 52 and the score of the second classification 62 is calculated only for data 24 which has been classified as negative 28 by the first classification 52 and classified as positive 26 by the second classification 62. This may allow identifying data which is likely classified falsely as negative, i.e., false negatives. In this case, the comparison module 70 determines the result signal 80 by calculating the difference between the scores of the classifications 52 and 62. The data 24 is labeled as risky 30 if the difference between the scores of the classifications 52 and 62 is above a certain threshold difference score. In this embodiment, the threshold difference score is an adjustable parameter which can be adjusted via the communication interface 14 and the antenna array 16 (not shown). In other embodiments, the classifications may be compared if the labels assigned to the data by the different models are not identical. In other words, in these embodiments all conflicting classifications may be compared in the comparison module.

The system 10 may be used, for example, for technology monitoring or literature search. The system may improve decision-making capabilities with regards to documents with improved efficiency as less critical documents may be missed due to reducing the number of false negatives while keeping the number of false positives low. In other embodiments, if data which is labeled positive is subject to intellectual review by an expert user, e.g., documents that need to be read in technology monitoring, then the system may minimize an effort for reviewing the documents by reducing the number of false positive given an acceptable risk of false negatives.

The system 10 for classifying data 24 may also be used for labeling the data 24 and building Knowledge Bases, e.g., for business or technology documents. The system 10 may be understood to provide a risk-aware classification.

Other fields of application include identifying vegetarian substitutes for animal products used in food and pharmaceutical products. For example, alternatives to gelatin in food items such as jams, jellies, chewy candies using plant-based gums or polysaccharides may be determined. Therefore, for example, research articles that produce plausible combinations of chemical compound that are used in preparations of food substitutions may be used as training data. Many of such combinations of chemical compounds can be expressed as heuristics and a classifier can identify documents and chemical structure that are stable and can be used to build such food substitutions.

The system may also be used for classification of objects within images, e.g., automatically identifying objects from images. This may allow improving an object detection quality. Identifying objects in images may be used in quality control during production processes. In these cases, reducing misclassification may allow to reduce unnecessary stops of production lines since errors in quality control may be reduced. The system may also, for example, be applied in agricultural and chemical production domains. For example, production plant operations may be optimized. The system may learn global influences and interaction patterns within large complex plants and predict responses, e.g., change in production yield, to stimuli, e.g., change in certain parameters. Operations of such plants are to large extent currently driven base on collected heuristic through decades of experience on the part of expert users. Integration of these heuristics by combining them with the CNN may reduce misclassification errors. Misclassification in the agricultural production domain may lead, for example, to application of unsuitable pesticides and may therefore harm the environment. Reducing misclassification errors may thus, for example, allow to reduce harm to the environment.

The system may also be used for retrosynthesis or automatically predicting reaction steps for chemical compositions. This may allow for an automatic and simulated planning of chemical reactions. This may reduce hundreds of trial and errors based iterations within chemical R&D labs. Furthermore, in case of retrosynthesis, a misclassification may lead to dangerous experimental conditions. These may be reduced by improving the classification.

The system may furthermore be used for predicting, identifying and monitoring potential competitors and customers. The system may constantly scan online information sources to identify potential competitors and customers. Combining heuristics with deep learning methods allows improving the results of the monitoring procedure.

Figure 5:
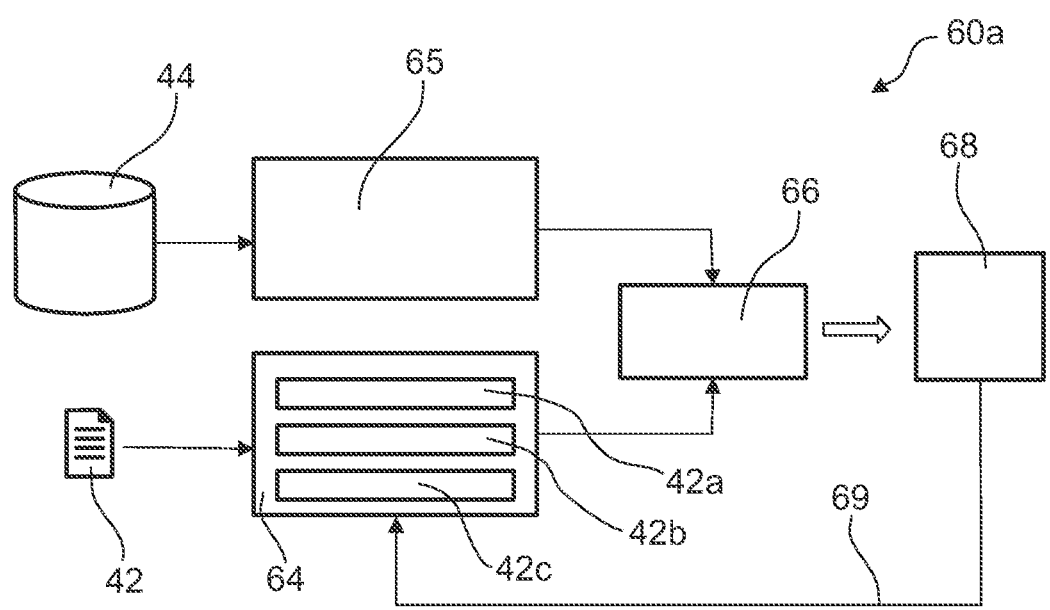
FIG. 5 shows schematically and exemplarily an embodiment of a second data driven model.

FIG. 5 shows an embodiment of the second data driven model 60a. The rule module 64 includes rules 42a, 42b and 42c of the set of rules 42. Rules 42a and 42b indicate that the data is positive if they are fulfilled and rule 42c indicates that the data is negative if it is fulfilled. In this embodiment, the rules are domain heuristics. Labeled historic data 44 is preprocessed in context hierarchy module 65 providing a context hierarchy. The rules 42a, 42b, and 42c and the context hierarchy are provided to an optimizer 66. The optimizer 66 is used to learn a generative model 68 in dependence of the rules 42a, 42b, and 42c, and the context hierarchy, i.e., based on the set of rules 42 and the labeled historic data 44. The generative model 68 assigns importance scores 69 to each of the rules 42a, 42b, and 42c based on the respective rules fit on the labeled historic data 44. Therefore, for each rule a ratio of correctly assigned labels to the total number of data points is determined and defined as importance score 69. A higher importance score 69 means that the respective rule 42a, 42b, and 42c better fits the labeled historic data 44. By analyzing the importance scores 69, corresponding to weights of the rules, a risk of having incorrect labels in the labeled historic data 44 may be reduced. If one of the rules 42a, 42b, and 42c has an importance score 69 below an expected importance score, the labeled historic data 44 is optimized based on the importance scores 69 assigned to the rules 42a, 42b, and 42c by augmenting the labeled historic data 44, e.g., adding additional labeled data which increases the importance score of a respective rule or removing data with incorrect labels. Expected importance scores may be provided, for example, as an external importance scores by an expert user based on domain knowledge.

Figure 6:
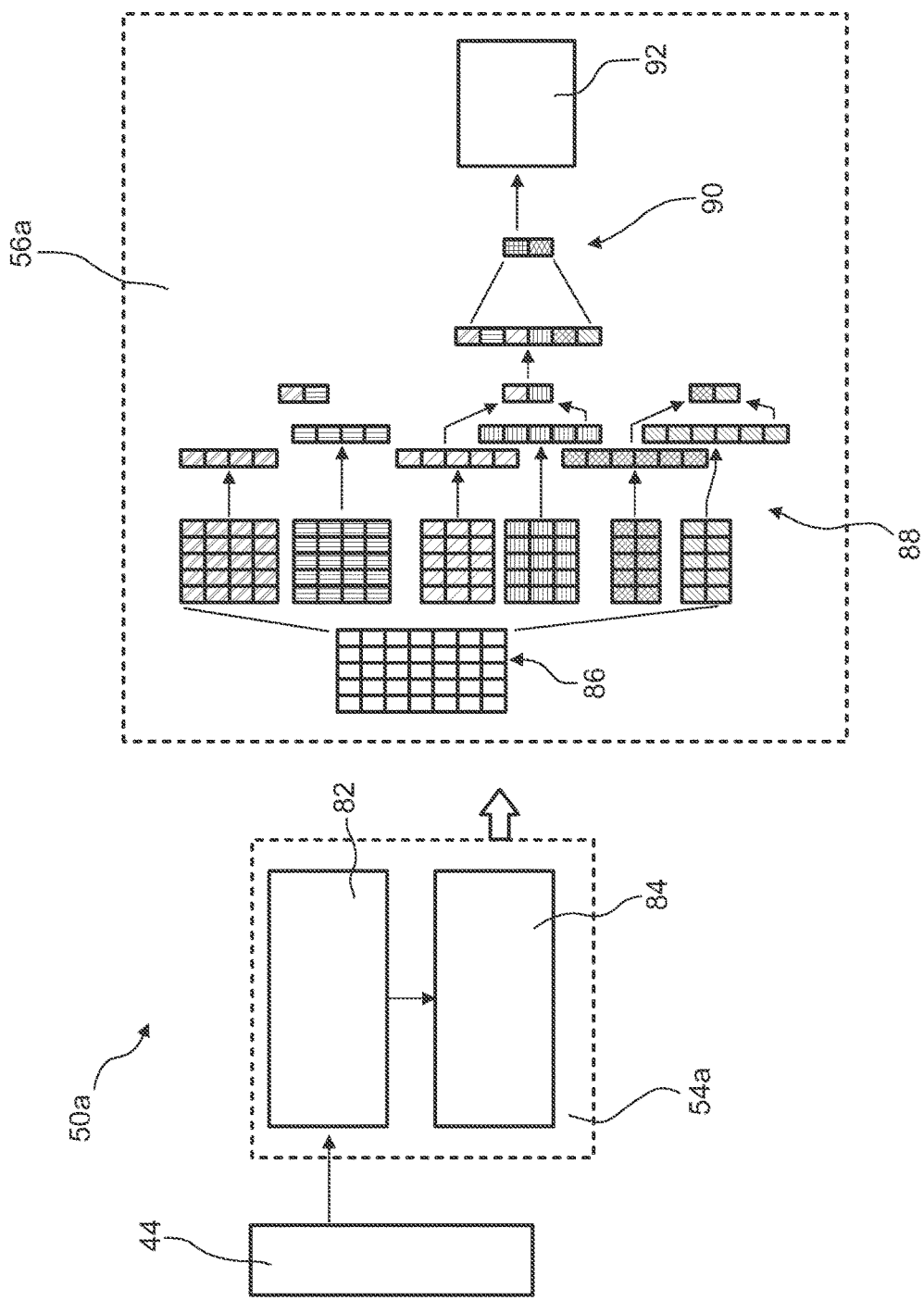
FIG. 6 shows schematically and exemplarily an embodiment of a first data driven model.

FIG. 6 shows schematically and exemplarily an embodiment of a first data driven model 50a. Labeled historic data 44 is preprocessed in preprocessing module 54a performing pretraining by GloVe embeddings 82 followed by parametric attention 84. The GloVe embeddings 82 provide vector representations for words, i.e., pretrained word vectors. The output of preprocessing module 54a is provided to a CNN 56a which includes an input layer 86, several hidden layers 88, and an output layer 90. The CNN 56a uses a logistic regression cost function 92 in this embodiment. After CNN 56a is trained, it may be used instead of CNN 56 in FIG. 4.

Figure 7:
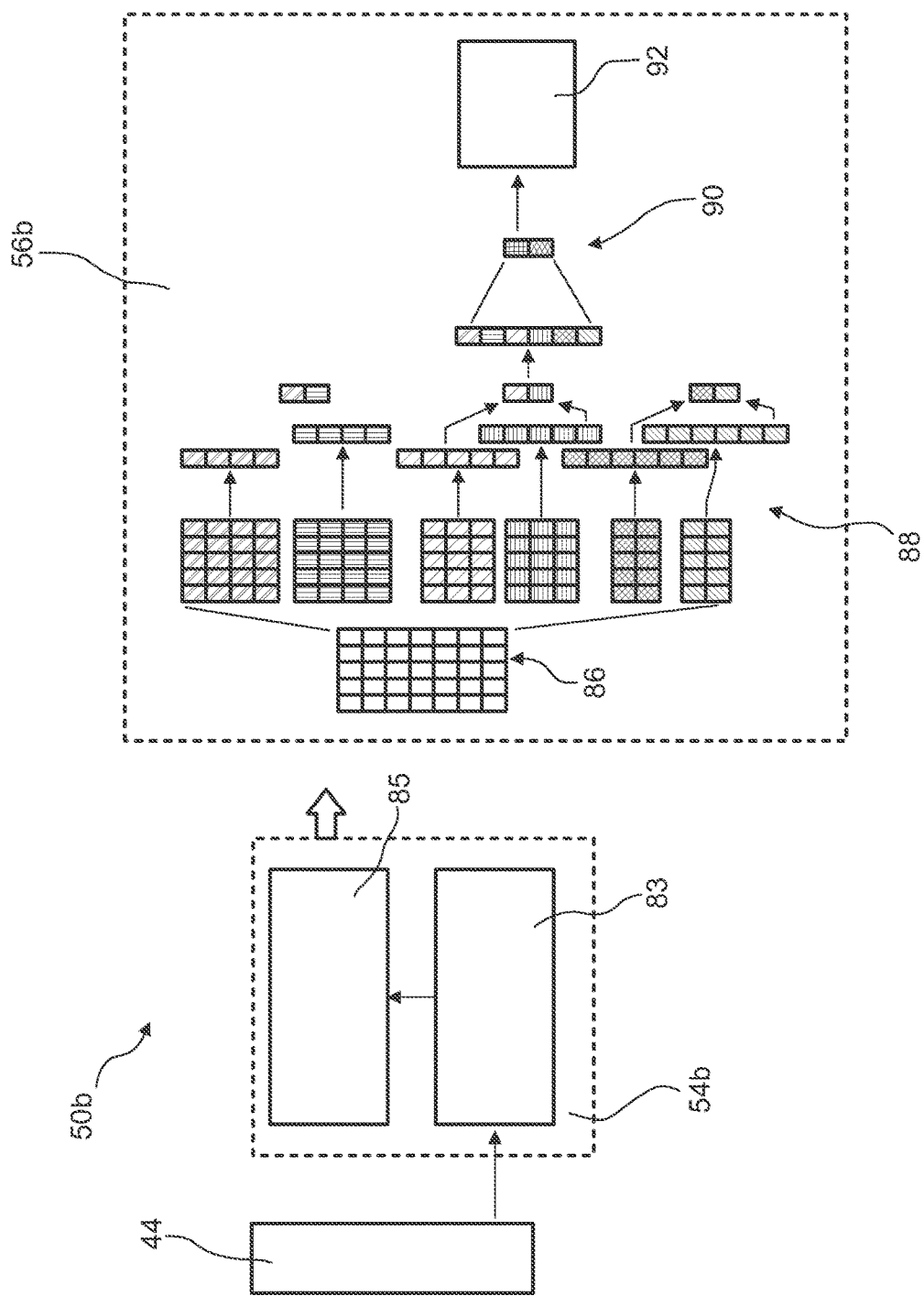
FIG. 7 shows schematically and exemplarily another embodiment of the first data driven model.

FIG. 7 shows schematically and exemplarily another embodiment of the first data driven model 50b. Labeled historic data 44 is preprocessed in preprocessing module 54b performing pretraining by Skip-gram embeddings 83 followed by Elmo pretraining 85. The Elmo Pretraining 85 provides pretrained word vectors. The output of preprocessing module 54b is provided to a CNN 56b which includes an input layer 86, several hidden layers 88, and an output layer 90. The CNN 56b uses a logistic regression cost function 92 in this embodiment. After CNN 56b is trained, it may be used instead of CNN 56 in FIG. 4. Any other classification model may also be used instead of CNN 56 in FIG. 4.

Figure 8:
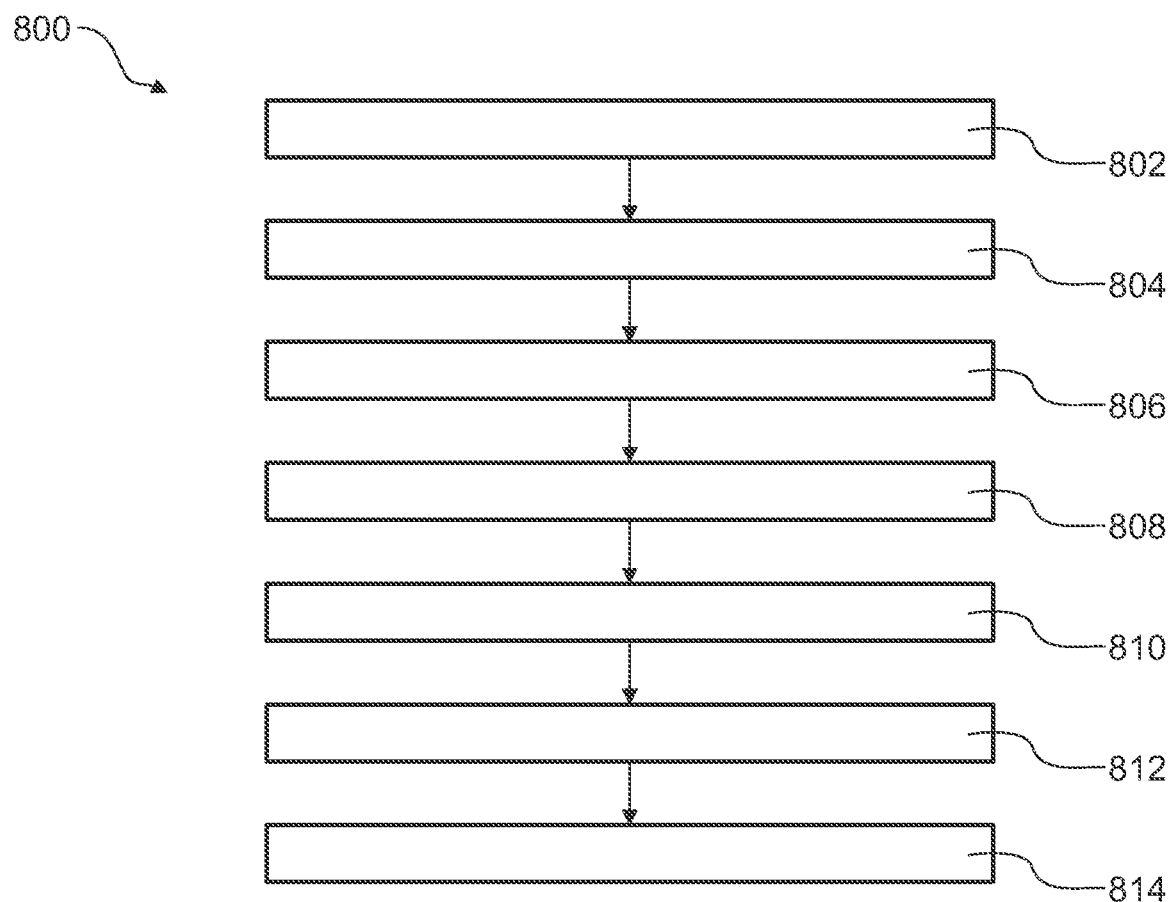
FIG. 8 shows a schematic flow diagram of an embodiment of the method for classifying data.

FIG. 8 shows an embodiment of a computer implemented method 800 for classifying data. The method 800 may be performed, for example, by the system 10. In this embodiment, the method 800 performs binary text classification. In other embodiments, other classifications may be performed, e.g., speech classification, video classification, image classification, or any other type of classification. The other classifications may for example be performed based on one-vs-all.

In step 802, a second data driven model is provided. The second data driven model comprises a set of rules. The rules include domain heuristics.

In step 804, a first data driven model is provided such that it is independent of the set of rules. The first data driven model is trained based on labeled historic data. The first data driven model includes a pretrained CNN which serves as classification model learned based on automatically extracted features from the labeled historic data.

In step 806, the data is obtained. In other embodiments, steps 802, 804, and 806 may also be interchanged.

In step 808, the data is used as input to the CNN of the first data driven model which determines a first classification for the data. The first classification provides a label which is either positive or negative, additionally a score is associated with the label.

In step 810, a second classification is determined for the data by the second data driven model. Therefore, each rule determines a label for the data. This generates a number of labels that corresponds to the number of rules. Depending on the ratio of positive labels to negative labels, a score is determined for the data, e.g., if there are 20 rules and 16 label the data as positive, the score is 0.8. In other embodiments, the score may also be determined in another manner, e.g., based on a generative model. In yet other embodiments, a score and a label may be assigned to the data. For example, if more labels are positive than negative, a positive label may be assigned to the data, i.e., the label is determined based on a majority vote. If more labels are negative than positive, a negative label may be assigned to the data.

In this embodiment, the second classification is only determined if the first classification provides a negative label to the data. This allows to reduce calculation load. In other embodiments, the second classification may be determined independent of the first classification.

In step 812, the first classification is compared with the second classification by calculating a difference between the score of the first classification and the score of the second classification. Furthermore, in this embodiment, the first classification is only compared to the second classification if the first classification provides a negative label to the data. In other embodiments, the comparison may be performed independent of the label of the first classification. In other embodiments, comparison of the classifications may be performed in other ways, e.g., further conditions may be considered. If the second classification includes a label assigned to the data, for example, the first classification and the second classification may initially be compared by determining whether they provide the same label, i.e., both positive, e.g., score above 0.5, or both negative, e.g., score below 0.5. If both models provide the same label, step 814 may be performed. If the label assigned to the data by the second classification is different to the label assigned to the data by the first classification, the classifications may be additionally compared by calculating the difference between the score of the first classification and the score of the second classification.

In step 814, a result signal is provided based on a result of their comparison. In other embodiments, the result signal may be provided based on the classifications. In this embodiment, the result signal indicates the label assigned to the data. The result signal is determined based on the difference between the scores of the first classification and the second classification. In this embodiment, the data is classified as risky if the difference between the scores of the first classification and the second classification is above a certain threshold difference score, e.g., 0.3. The threshold difference score may be adjusted in order to balance between risk and cost saving. In particular, data classified as risky generate additional cost as it need to be checked and labeled by an expert user. In other embodiments, if the second classification includes a label assigned to the data, the result signal may indicate the label assigned by both models, if both models assign the same label. If the labels assigned by the models are different the result signal may be determined based on the difference between the scores of the first classification and the second classification.

The result signal is transmitted to a user device in this embodiment. In other embodiments, the result signal may also be displayed or transmitted to any other device, e.g., an external server or a memory of the system classifying the data.

In other embodiments, the method may include one or more of the following: a step in which the rules are provided in Boolean query language, a step in which a generative model is included in the second data driven model and trained based on the set of rules and the labeled historic data, a step of obtaining the labeled historic data, a step of obtaining the set of rules, a step of transmitting the result signal, and a step of displaying the result signal. Furthermore, the generative model may assign an importance score to each of the rules based on its fit on the labeled historic data. The labeled historic data may be optimized based on the importance scores assigned to the rules.

Other variations to the disclosed embodiments can be understood and effected by those skilled in the art in practicing the claimed invention, from a study of the drawings, the disclosure, and the appended claims.

In the claims, the words "comprising" and "including" do not exclude other elements or steps, and the indefinite article "a" or "an" does not exclude a plurality.

A single unit or device may fulfill the functions of several items recited in the claims. The mere fact that certain measures are recited in mutually different dependent claims does not indicate that a combination of these measures cannot be used to advantage.

A computer program may be stored/distributed on a suitable medium, such as an optical storage medium or a solid-state medium, supplied together with or as part of other hardware, but may also be distributed in other forms, such as via the Internet or other wired or wireless telecommunication systems.

Any reference signs in the claims should not be construed as limiting the scope.

The invention relates to classifying data. A first data driven model is trained based on labeled historic data. A second data driven model, comprises a set of rules. Data to be classified is obtained at the first data driven model and the second data driven model. A first classification is determined for the data by the first data driven model and a second classification is determined for the data by the second data driven model. A result signal is provided based on the classifications.

The invention claimed is:

1. A system of classifying data comprising a communication interface, and a processor, the system configured to:
   provide a first data driven model, wherein the first data driven model is trained based on labeled historic data,
   provide a second data driven model, wherein the second data driven model comprises a set of rules,
   obtain data at the first data driven model and the second data driven model via the communication interface,
   determine a first classification for the data by the first data driven model,
   determine a second classification for the data by the second data driven model, and
   provide a result signal based on the first classification and the second classification,
   wherein the system is configured to determine the result signal based on comparing the first classification with the second classification by calculating a difference between a score of the first classification and a score of the second classification and,
   wherein the system is configured to provide the result signal as classifying the data as risky if the difference between the score of the first classification and the score of the second classification is above a certain threshold difference score.

2. The system according to claim 1, wherein the set of rules are provided in Boolean query language.

3. The system according to claim 1, wherein the second data driven model comprises an ensemble model, in particular a generative model, learned based on the set of rules and the labeled historic data.

4. The system according to claim 3, wherein the ensemble model is configured to assign an importance score to each of the set of rules based on its fit on the labeled historic data and wherein the system is configured to optimize the labeled historic data based on the importance scores assigned to the set of rules.

5. The system according to claim 1, wherein the first data driven model includes a neural network.

6. The system according to claim 1, wherein the first data driven model is configured to automatically extract features from the labeled historic data and for learning a classification model based on the labeled historic data for providing the first classification.

7. The system according to claim 1, wherein the first data driven model is independent of the set of rules.

8. The system according to claim 1, wherein the threshold difference score is an adjustable parameter allowing to balance between risk and cost saving.

9. The system according to claim 1, wherein the first classification is determined based on a binary classification between positive and negative and wherein the system is configured to calculate the difference between the score of the first classification and the score of the second classification only for data which has been classified as negative by the first classification.

10. The system according to claim 1, wherein the communication interface is configured to receive the data, the labeled historic data, the set of rules, or any combination thereof and to transmit the result signal, display the result signal, or transmit and display the result signal.

11. A computer implemented method of classifying data, comprising:
 providing a first data driven model, wherein the first data driven model is trained based on labeled historic data,
 providing a second data driven model, wherein the second data driven model comprises a set of rules,
 obtaining data at the first data driven model and at the second data driven model,
 determining a first classification for the data by the first data driven model,
 determining a second classification for the data by the second data driven model,
 providing a result signal based on the first classification and the second classification,
 providing the set of rules in Boolean query language,
 training an ensemble model, in particular a generative model, included in the second data driven model based on the set of rules and the labeled historic data,
 assigning by the ensemble model an importance score to each of the set of rules based on its fit on the labeled historic data,
 optimizing the labeled historic data based on the importance scores assigned to the set of rules,
 providing the first data driven model including a neural network,
 providing the first data driven model such that it automatically extracts features from the labeled historic data and learns a classification model based on the labeled historic data for providing the first classification,
 providing the first data driven model such that it is independent of the set of rules,
 determining the result signal based on comparing the first classification with the second classification by calculating a difference between a score of the first classification and a score of the second classification,
 providing the result signal as classifying the data as risky if the difference between the score of the first classification and the score of the second classification is above a certain threshold difference score,
 adjusting the threshold difference score in order to balance between risk and cost saving,
 determining the first classification based on a binary classification between positive and negative,
 determining the second classification based on a binary classification between positive and negative,
 calculating the difference between the score of the first classification and the score of the second classification only for data which has been classified as negative by the first classification,
 obtaining the labeled historic data,
 obtaining the set of rules,
 transmitting the result signal, and displaying the result signal.

12. A computer program product of classifying data, wherein the computer program product comprises program code causing a processor to carry out the method according to claim 11, when the computer program product is run on the processor.

* * * * *